United States Patent [19]

Nelson

[11] 4,313,549

[45] Feb. 2, 1982

[54] STRINGING DEVICE FOR RETAINING FISH

[76] Inventor: Dennis I. Nelson, 3811 S. County Rd., 13C, Loveland, Colo. 80537

[21] Appl. No.: 799,671

[22] Filed: May 23, 1977

[51] Int. Cl.³ .............................................. A45F 5/00
[52] U.S. Cl. .................................................... 224/103
[58] Field of Search .............. 224/5 R, 7 R, 7 A, 7 B, 224/7 D, 7 E, 25 R, 45 T, 45 W, 103, 268, DIG. 920, DIG. 921; 43/54.5 R; D22/14, 31

[56] References Cited

U.S. PATENT DOCUMENTS

| 597,016 | 1/1898 | Parker | 224/7 E |
|---|---|---|---|
| 918,462 | 4/1909 | Mullins | 224/7 E |
| 936,701 | 10/1909 | Callender | 224/45 W |
| 2,320,067 | 5/1943 | Caughren | 224/7 R |
| 2,592,389 | 4/1952 | Budy | 224/7 E |
| 2,662,257 | 12/1953 | Milan et al. | 224/7 E |
| 3,072,307 | 1/1963 | Shook | 224/7 D |
| 3,285,482 | 11/1966 | Bedsaul, Sr. | 224/25 R |

Primary Examiner—Trygve M. Blix
Assistant Examiner—Stephen P. Avila
Attorney, Agent, or Firm—Hugh H. Drake

[57] ABSTRACT

A fish stringing implement for use in holding, retaining and stringing a fish onto a flexible retaining line, comprising a stiff wire member secured to the retainer line. The implement is formed by a straight shank secured at one end to said stringer line and formed at its other end with a downward bend. A downwardly and forwardly inclined shank leg extends from the bend and terminates at its lower end in a bight portion from which a prong leg extends upwardly to a reverse bend from which projects an inturned prong terminating in a point. The point is in approximate vertically spaced relation with respect to the downturned bend on said shank so that a user can hold the straight shank while inserting the point in the gills of a fish to hook the fish onto the implement and slide the fish into the bight portion thereof. The user can further retain the fish in the bight of the implement by holding the shank with his fingers and placing his thumb over the point. The user can further string the fish onto the flexible line by holding the prong leg while sliding the fish over the shank portion onto the retaining line.

9 Claims, 6 Drawing Figures

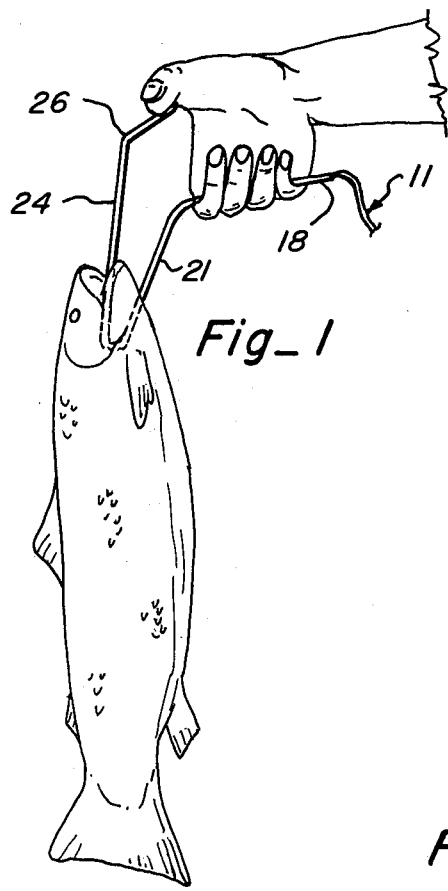
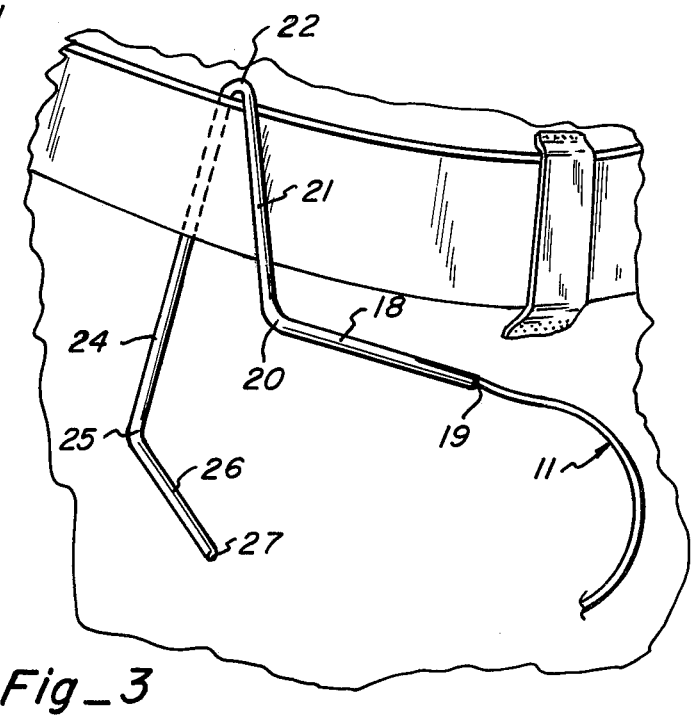
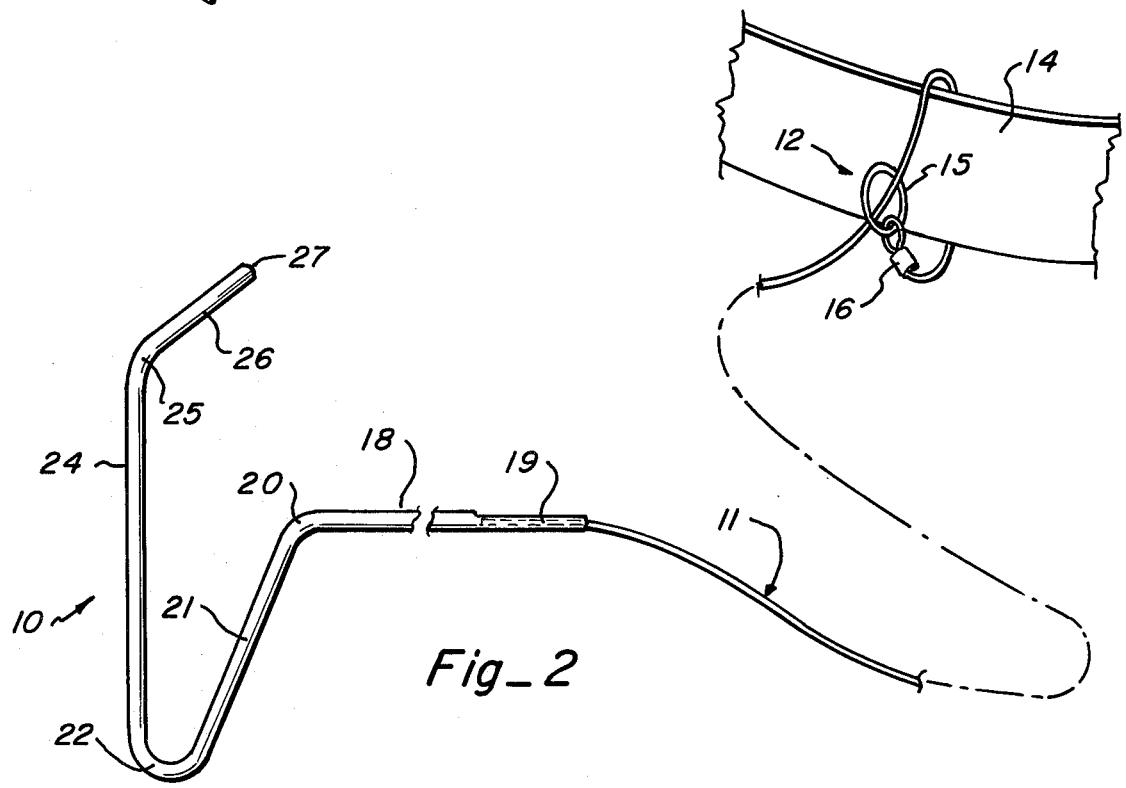

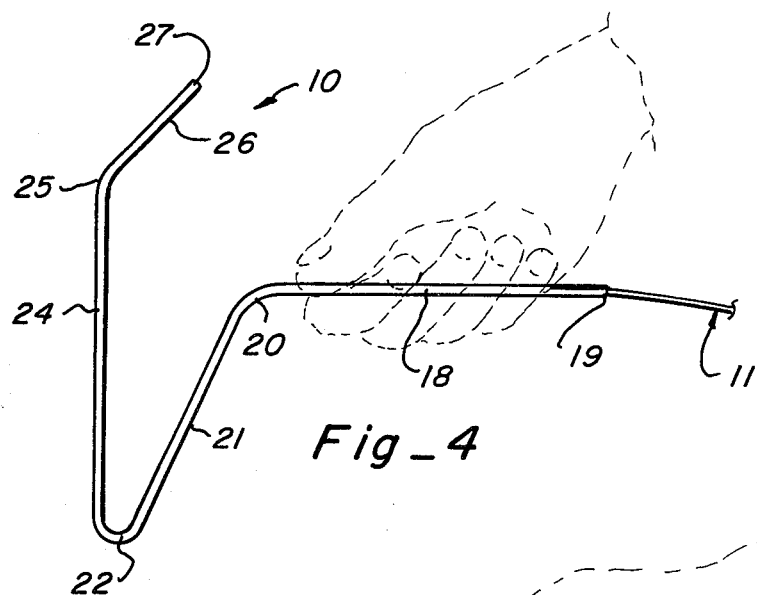
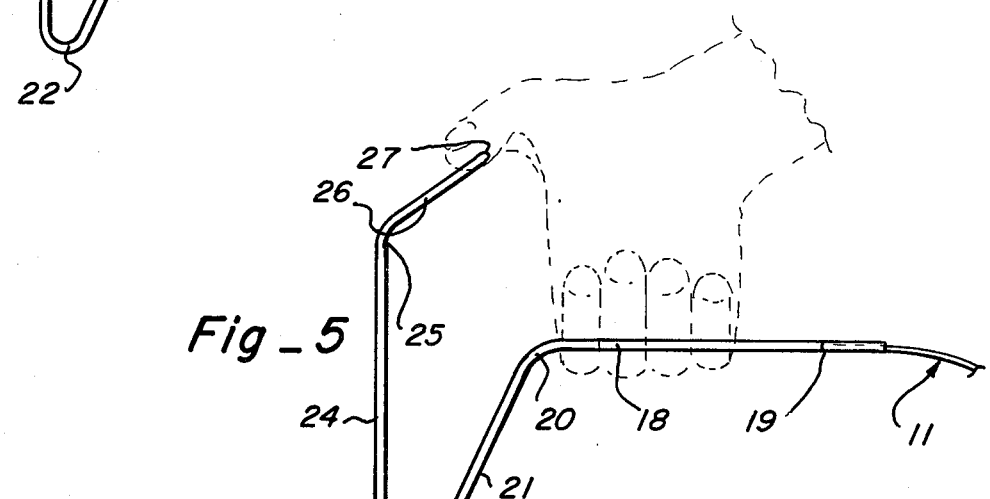
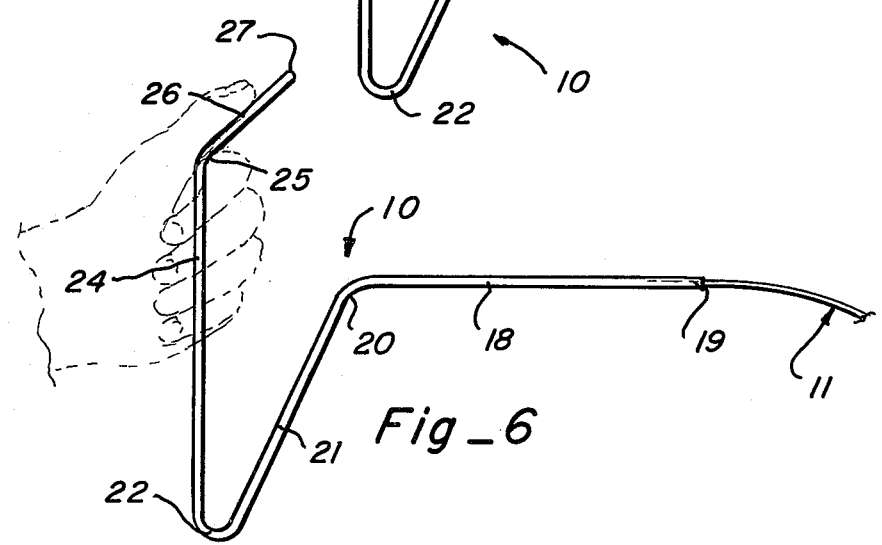

STRINGING DEVICE FOR RETAINING FISH

The present invention relates to piscatorial apparatus and more particularly to a device for holding, stringing and retaining fish.

In the art of fishing, and particularly in connection with the technique of fishing streams and rivers in which the fisherman wades to a depth which can vary from a few inches to a few feet, while utilizing a rod, line and lure, difficult problems are often encountered when a fish has been caught and it is desired to hold the fish, release it from the lure and string it onto a string or retaining line without leaving the stream or river. In this process, the fisherman must hold onto his pole, catch and hold the fish, remove the lure and string it onto a retaining cord, all under circumstances of somewhat unsure footing and with a fish which can vary from a few ounces to a few pounds and is invariably active and lively.

Stringing implements, comprising essentially a large hook or similar hooked member on the end of a line or cord, are known in the art. See for example, U.S. Pat. No. 918,462, issued Apr. 13, 1909, to L. B. Mullins, and U.S. Pat. No. 2,477,201, issued July 26, 1949, to J. M. Points.

It is the principal object of the present invention to provide an improved fish stringing tool. A more specific object is to provide an improved fish stringing tool which enables the fisherman to readily engage the fish which has been caught, hold the fish while the lure is being removed from the fish's mouth, and then string the fish onto a retaining line or cord, all with a minimum risk of dropping and losing the fish.

A further object of the present invention is to provide a fish stringing implement which is easy to manipulate and use, can be readily grasped by the fisherman and which is simple, rugged and highly convenient to use.

Other objects and advantages of the present invention will be apparent from the following detailed description accompanying drawings.

SUMMARY OF THE INVENTION

The improved fish holding and stringing device embodying the invention comprises a unique implement secured to a flexible cable or cord adapted to be fastened in any appropriate manner to the belt or other gear worn by a fisherman. The unique fish holding and stringing implement is formed by a generally straight shank secured at one end to the stringing cord and at its other end being bent downwardly and thence upwardly to form a bight with a pointed or free end defining a hook or prong inturned towards the straight shank. When the straight shank is held in a horizontal position, the inturned point terminates above the bight and in approximately vertical alignment with the downturned end of the straight shank. With the novel configuration, the pointed end can be hooked through the gills of a fish and out through the fish's mouth, and the fish slid down onto the hook to be retained in the bight portion. The fisherman, by grasping the straight shank portion with his fingers and placing his thumb upwardly over the free end, prevents the fish from slipping off of the implement. While holding the fish on the implement with one hand, the fisherman can readily disengage the hook or lure from the fish's mouth. By then grasping the upturned portion of the implement above the bight and below the hook or prong with his free hand, the fish can be slid up onto the straight shank portion and then onto the flexible cord or line on which the fish will be retained. The hook and bight portion of the implement is then engaged with the fisherman's belt or other gear or equipment with the fish securely retained on the flexible cord or line.

DESCRIPTION OF THE DRAWINGS

FIG. 1 is an illustration of a fish stringing device or implement embodying the present invention being held in the hand of a fisherman and retaining a fish.

FIG. 2 is an isometric view, substantially in elevation, of a stringing implement embodying the present invention and with the flexible cord secured to a belt.

FIG. 3 is an isometric view of the present invention, substantially in elevation, showing the stringing implement hooked over a belt in retaining position.

FIG. 4 is a generally schematic elevation view of a stringing implement embodying the present invention being held in a fisherman's hand for hooking into a fish.

FIG. 5 is a view similar to FIG. 4 but showing the implement in a fisherman's hand for retaining a fish.

FIG. 6 is a view similar to FIG. 4 but showing the implement in a fisherman's hand positioned for stringing a fish onto the flexible line.

DESCRIPTION OF THE PREFERRED EMBODIMENT

In accordance with the foregoing objects and as shown in the drawings, the present invention contemplates a fish stringing implement 10 secured to a flexible line or cable 11 such as a cord, chain, rope or the like, which is in turn adapted to be secured by a securing device 12 to a belt 14 or other gear worn by a fisherman. In the embodiment shown, the securing device 12 is in the form of a ring 15 secured to one end of the cable 11 by a ferrule 16. By looping the cable under the belt 14 and back through the ring 15, the stringing device is securely held on the fisherman.

For purposes of engaging, holding and stringing a fish, the stringing implement 10 comprises a stiff wire or rod member forming a straight shank 18 secured at one end to the free end of the cable or cord 11 by a ferrule 19 or other appropriate clamping or fastening device. Any appropriate fastening means may be utilized so long as the flexible cord or cable 11 is held securely to the straight shank 18 of the implement 10. The straight shank 18 is of a length sufficient to enable the fisherman to hold the shank conveniently and comfortably in one hand. At its outer end, that is the end 20 of the straight shank opposite from the ferrule 19, the straight shank is bent downwardly in an obtuse bend 20 to form a downwardly and forwardly inclined shank leg 21. The shank leg 21 is of a length approximately equal to or slightly less than the length of the shank 18 and terminates at its lower end in an upwardly opening bight 22, from which an upwardly and slightly outwardly extending prong leg 24 extends. The shank leg 21, bight 22 and prong leg 24 define together a narrow V-shaped configuration. At its upper end, generally above the bight 22 and the downward bend 20 on the straight shank 18, the prong leg defines an obtuse bend 25 and an inturned prong or hook 26 terminating in a point or free end 27. The inturned prong 26 and the point or free end 27 of the inturned prong are spaced generally vertically above the bight 22 and downward bend 20 at the outer end of the straight shank section, and the point or free end 27 is in approximate vertical alignment with the downward bend 20. The spacing between the point or free end and the downward bend is sufficient to enable the point or free end 27 to be inserted into the gills and out of the mouth of a fish for holding and retaining the fish as shown in FIG. 1.

The implement is formed of a stiff rod, wire or bar of metal, plastic, plastic coated metal, or other appropriate material. The material must be sufficiently stiff and rugged, and yet light in weight so as not to be burdensome to the fisherman.

When a fish has been hooked and engaged with the stringing implement and subsequent slid onto the flexible cord or line for retention thereon, the prong 27 can be hooked over the fisherman's belt and the prong 24 slid down behind the belt so that the bight 22 catches over the upper edge of the belt as shown in FIG. 3. In this position, the stringing implement is securely held on the fisherman with the fish supported and retained on the flexible line and dangling at the fisherman's side.

The stringing implement finds particular utility when a fisherman is wading in a rapidly moving stream or river and especially when the water is at or above hip level. When a fish is caught on a line in a conventional manner, the fisherman, after appropriately playing the fish and reeling it close enough, catches and holds the fish in a net. At this point, the fisherman can, by holding onto the shank portion of the stringing implement as shown in FIG. 4, insert the point or free end 27 into the fish's gills to hook the fish and retain it in the bight 22 of the implement. As the fish is removed from the net or the water, the fisherman holds the shank 18 in his fingers and places his thumb over the point or free end 27 as shown in FIGS. 1 and 5. This prevents the fish from escaping or wiggling off of the implement so that the fisherman can readily remove the hook or lure from the fish's mouth. When the fish is free of the hook and line, the fisherman simply grasps the prong leg 24 and prong 26 with a free hand, as shown in FIG. 6, and by manipulating the implement, allows the fish to slide over the shank and onto the flexible cord or line. The implement can then be hooked over the fisherman's belt or into the fisherman's gear as shown in FIG. 3 with the fish securely retained on the flexible cord or stringing line. The fisherman can then continue fishing without fear of losing his previous catch.

As an alternative procedure for securing the implement 10 to the fisherman's gear, some fishermen may prefer to loop the string 11 and ring 15 loosely to a belt, D-ring or other part of the gear. Upon making an initial catch, the fish is strung onto the string 11 in the manner described above. The string being looped through a D-ring or belt, implement 10 is then hooked through the ring 15. The fish is securely held on the string 11 and acts as a stop for the ring 15. If desired, this can be repeated for each fish so that the ring 15 is always outside the fish. With this procedure, it is possible to remove the entire string of fish from the fisherman's gear without unstringing each fish.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses of the present invention falling within the spirit and scope of the invention as expressed in the appended claims.

I claim as my invention

1. A fish stringing implement for use in holding, retaining and stringing a fish onto a flexible retaining line, comprising a stiff wire member having a straight shank portion secured at one end to said retaining line and formed at its other end with a downward bend portion, a downwardly and forwardly inclined shank leg portion extending from said downward bend portion and terminating at its lower end in a bight portion, a prong leg portion extending upwardly from said bight portion and formed at its upper end with a reverse bend portion, and an inturned prong portion extending from said reverse bend portion and terminating in a point, said point being in approximate vertically spaced relation with respect to the downturned bend portion on said shank portion, whereby a user can hold said straight shank portion while inserting the point in the gills of a fish to hook the fish onto said implement and slide said fish into the bight portion thereof and said user can further retain said fish in the bight portion thereof by holding said shank portion with his fingers and placing his thumb over the point, and means connecting said one end of said straight shank portion to said line for enabling said user to further string said fish onto said retaining line by holding said prong leg portion while sliding said fish over said shank portion onto said line.

2. A fish stringing implement for use in holding, retaining and stringing a fish onto a flexible retaining line comprising a straight shank secured at one end to said line and formed at its other end with a downward bend, a downwardly and forwardly inclined shank leg extending from said downward bend and terminating in a bight, a prong leg extending upwardly from said bight and formed at its upper end with a reverse bend, an inturned prong extending from said reverse bend and terminating in a point, said point lying in spaced vertical relationship with respect to the downward bend on said shank whereby said point can be hooked into a fish and the fish retained in said bight for subsequent stringing onto said retaining line, and means connecting said one end of said straight shank portion to said line for enabling said user to further string said fish onto the flexible line by holding said prong leg portion and sliding said fish over said shank portion onto said line.

3. A fish stringing implement as defined in claim 2 wherein said shank, shank leg, bight, prong leg and prong lie in a common geometrical plane.

4. A fish stringing implement as defined in claim 2 wherein said retaining line includes means on the end thereof opposite from said implement for securing the stringer line to a fisherman's gear.

5. A fish stringing implement as defined in claim 2 wherein said shank leg, prong leg and bight define a narrow, V-shaped configuration.

6. A fish stringing implement as defined in claim 2 wherein said point lies in vertical spaced relationship with respect to said shank so that the thumb of a user can be engaged over said point while the fingers of the user grip said shank.

7. A fish stringer comprising:
a stiff rodlike member having a shank from one end of which a shank leg projects generally at an angle with respect to said shank, a prong leg projects at an acute angle from the end of said shank leg remote from said shank to define with said shank leg a narrow V-shaped bight, and a prong projects from the end of said prong leg remote from said bight at an angle to the prong leg disposing said prong in spaced relationship to said shank by distance and orientation permitting the thumb of a user to be engaged over the end of said prong while fingers of the same hand of said user clampingly encircle said shank;

and a flexible fish retaining line having one end thereof secured to the other end of said shank by means for enabling said user to further string said fish onto said retaining line by holding said prong leg portion while sliding said fish over said shank portion onto said line.

8. A fish stringer as defined in claim 7 in which all of said shank, shank leg, prong leg and prong are disposed in a single geometrical plane.

9. A fish stringer as defined in claim 7 in which all of said shank, shank leg, prong leg and prong are formed of an integral length of wire stock.

* * * * *